United States Patent
Fodor et al.

(10) Patent No.: US 8,320,271 B2
(45) Date of Patent: Nov. 27, 2012

(54) DISCONTINUOUS TRANSMISSION AND RECEPTION

(75) Inventors: Gabor Fodor, Hässelby (SE); Muhammad Ali Kazmi, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 370 days.

(21) Appl. No.: 12/675,911

(22) PCT Filed: Sep. 3, 2007

(86) PCT No.: PCT/EP2007/007680
§ 371 (c)(1), (2), (4) Date: Mar. 18, 2010

(87) PCT Pub. No.: WO2009/030251
PCT Pub. Date: Mar. 12, 2009

(65) Prior Publication Data
US 2010/0309798 A1    Dec. 9, 2010

(51) Int. Cl.
*G01R 31/08* (2006.01)
*H04W 4/00* (2009.01)

(52) U.S. Cl. .................................. 370/252; 370/328

(58) Field of Classification Search .............. None
See application file for complete search history.

(56) References Cited

U.S. PATENT DOCUMENTS

| | | | |
|---|---|---|---|
| 6,424,637 B1* | 7/2002 | Pecen et al. | 370/328 |
| 2004/0072559 A1 | 4/2004 | Kakumaru et al. | |
| 2005/0032555 A1 | 2/2005 | Jami et al. | |
| 2008/0101268 A1* | 5/2008 | Sammour et al. | 370/311 |
| 2008/0232310 A1* | 9/2008 | Xu | 370/329 |

FOREIGN PATENT DOCUMENTS

EP    1613107 A2    1/2006

OTHER PUBLICATIONS

3rd Generation Partnerthip Project. "Adaptive DRX and DTX Setting for LTE_ACTIVE." 3GPP TSG-RAN WG2#55, R2-062819, Seoul, Korea, Oct. 9-13, 2006.

* cited by examiner

*Primary Examiner* — Nittaya Juntima
(74) *Attorney, Agent, or Firm* — Coats & Bennett, P.L.L.C.

(57) ABSTRACT

There is provided a method of determining a discontinuous reception and/or transmission cycle length, the method comprising determining information relevant to the cycle length from a high layer in a protocol stack; providing the information to a lower layer in the protocol stack; and in the lower layer of the protocol stack, determining the cycle length from the information.

32 Claims, 4 Drawing Sheets

| Service + App. Layer Protocol | Object Size, File Size or other application specific information | DRX Cycle Length |
|---|---|---|
| HTTP | Object size < 10 KB | DRX Cycle = 128 ms |
| | 10 KB < Object size < 100 KB | DRX Cycle = 32 ms |
| | 100 KB < Object size | DRX Cycle = 10 ms |
| FTP | File size < 10 KB | DRX Cycle = 512 ms |
| | 10 KB < File size < 100 KB | DRX Cycle = 128 ms |
| | 100 KB < File size | DRX Cycle = 64 ms |
| Voice Codec | Codec Type (Available in RTCP) | If (Codec Type == 1) DRX Cycle = 10ms If (Codec Type == 2) DRX Cycle = 20ms |
| Video Codec | Codec Type (Available in RTCP) | If (Codec Type == 1) DRX Cycle = 10ms If (Codec Type == 2) DRX Cycle = 20ms |

Figure 3

DISCONTINUOUS TRANSMISSION AND RECEPTION

TECHNICAL FIELD OF THE INVENTION

The invention, relates to discontinuous transmission and reception in Wideband Code Division Multiple Access (WCDMA) and Long Term Evolution (LTE) systems.

BACKGROUND OF THE INVENTION

In Wide-band Code Division Multiple Access (WCDMA) and Long Term Evolution (LTE) systems, discontinuous reception and transmission (DRX/DTX) allows a mobile terminal, known as user equipment (UE), to switch off its radio transceiver circuitry and thereby drastically reduce its power consumption. For instance, in a WCDMA network, when a UE is idle, or is in a Cell_PCH or URA_PCH state in connected mode, it can reduce its power consumption from 100-400 mA down to 5-10 mA using DRX.

When the UE is active in the sense that it "continuously" transmits and receives packets, discontinuous transmission and reception considerably reduces the power consumption and thereby increases the active mode time or talk time (i.e. the time that the UE can stay active without needing to recharge its battery). Indeed, DRX is supported in Continuous Packet Connectivity (CPC) in WCDMA systems, which is described in 3GPP specification TR 25.903, entitled "Continuous Packet Connectivity (CPC) for Packet Data Users", Release 7. Likewise, LTE specifications support DRX while the UE is in an LTE_ACTIVE state, which is described in 3GPP specification TS 36.300, entitled "Evolved Universal Terrestrial Radio Access (E-UTRA) and Evolved Universal Terrestrial Radio Access Network (E-UTRAN)".

When using DRX in an active mode (such as in LTE_ACTIVE), the DRX cycle length needs to be controlled so that the UE can send and/or receive data with sufficiently low latency, but still providing low power consumption. The base station associated with the UE can control the DRX cycle length using Radio Resource Control (RRC) and/or medium access control (MAC) signalling, or it can rely on the UE autonomously adjusting its DRX cycle. While in this latter case the amount of signalling over the radio interface is reduced, the network (i.e. the base stations and other nodes) must keep track of the current DRX cycle(s) of the UEs in LTE_ACTIVE. This is because the Radio Access Network (RAN) must be able to schedule a specific UE when, for instance, a burst of data needs to be delivered to the UE within a pre-defined deadline (depending on, among other aspects, the QoS requirements).

While in active mode, the UE uses voice and various (real-time, quasi-real-time and best effort) data services and thereby the packet inter-arrival (inter-sending) times dynamically change. Consequently, the times when the UE should activate and deactivate its receiver and transmitter may change frequently. In other words, the "optimum" situation is where the time instances that the UE should sleep and wake up are dynamically controlled to adapt to the subsequent packet arrival/departure instant. However for such "optimum" (i.e. fully dynamic) control, the associated control signalling over the radio interface would be prohibitive.

Therefore, because of the traffic dynamics, there is a fundamental trade-off between how close the DRX/DTX wake up time is to the ideal or optimum DRX/DTX setting and the amount of signalling required over the radio interface.

This trade-off between battery consumption and the complexity (and overhead) of the associated control signalling is widely recognized and several approaches have been proposed within the 3GPP.

In one approach, known as the "one level DRX/DTX cycle" approach, at any one time instant, there is a single pre-defined pattern stored in the UE according to which the UE turns its transceiver circuitry on and off. When the base station needs to change this pre-defined pattern, it uses control signalling to specify the new pattern that thereafter specifies the wake-up/sleep time instants.

In an alternative approach, known as the "two level DRX/DTX cycle" approach, two basically independent patterns are defined according to which the UE should turn its transceiver circuitry on and off. At any one point in time, by using the two patterns, the UE can calculate the next time instant when it has to change state. Alternatively, the base station can use explicit signalling to activate and de-activate either of the pre-defined cycle patterns. The two-level scheme is useful because it avoids the frequent reconfiguration of the currently used DRX pattern.

The continuous packet connectivity feature in WCDMA allows the activation of a two-level DRX scheme. In this approach, the UE switches to a longer DRX cycle if it is not served during a certain network-specified duration.

A hybrid approach that combines either the one-level or the two-level basic scheme with an autonomous behaviour of the UE has also been proposed. In this scheme, the UE dynamically and adaptively adjusts its current DRX pattern depending on the traffic arrival and departure pattern. As the UE follows pre-defined rules when adjusting its DRX interval and as the UE and the base station share a common (absolute) clock, the UE and the base station have common knowledge about the currently valid DRX interval at any point in time.

The above existing solutions focus on the trade-off between control signalling and changing or adapting the DRX/DTX cycle. Since the basic underlying assumption is that neither the UE nor the base station has enough (or accurate enough) knowledge about the traffic pattern (and thereby the packet inter-arrival times), these mechanisms are inherently reactive.

In all three basic approaches described above (one-level, two-level base station or hybrid base station controlled, and UE autonomous) the DRX/DTX cycle and the corresponding wake up and sleep times are specified and modified based on the recent activity of the UE and the base station. For instance, if the on-going service is web browsing, the UE can either autonomously, or upon an explicit order from the base station, extend its DRX period if there was no traffic activity on the radio channel. Thus the selection of the DRX cycle is mainly based on the amount of traffic in the buffer, the statistical model of the traffic type and/or a combination thereof.

As the DRX cycle is specified without precise information about the service or traffic type, the DRX pattern has to be specified without making use of information about the packet arrival/departure pattern that can be expected in the subsequent time period (which can be as much as a couple of seconds). Therefore, two problems arise:

The first problem is that the DRX cycle that the UE employs is either too conservative (the transceiver of the UE is active when there is no traffic), or it is not conservative enough (the transceiver of the UE is deactivated when there is data to schedule). In the former case (UE being too conservative) the battery lifetime is reduced, while the second case leads to increased packet delay.

The second problem is that the control signalling that is needed to keep the DRX cycle pattern up-to-date may become too frequent, which results in a high overhead and thereby wastage of radio resources.

Physical layer or MAC layer control signalling is used (for example in LTE) to switch between the DRX cycles. These channels contain a limited number of bits and their inappropriate or frequent use leads to significant overheads. Furthermore, the number of bits required increases with the increase in the number of DRX levels, (for example 1 bit for a 2-level DRX, 2 bits for up to a 4-level DRX and so on). Another limitation is that as the signalling is on/off in nature and (due to noise) it is also more prone to erroneous (or inverted) decisions at the receiver.

United States Patent Application Publication No. 2005/0032555 describes a method of intermittent activation of receiving circuitry of a mobile user terminal. The period with which the receiving circuitry is activated can be determined based on the type of service (for example packet data call, video clip, web-browsing, FTP sessions) that was provided in the last call connection to the mobile user terminal.

However, this method has the disadvantage that it relies on the most recent type of service provided to the mobile terminal to determine the cycle length, and as such, the determined cycle length might not be particularly suited to the next type of service to be provided to the mobile terminal.

Therefore, it is an object of the invention to provide improvements in the way in which a discontinuous reception and/or transmission cycle length is determined.

SUMMARY OF INVENTION

According to a first aspect of the invention, there is provided a method of determining a discontinuous reception and/or transmission cycle length, the method comprising determining information relevant to the cycle length from a high layer in a protocol stack; providing the information to a lower layer in the protocol stack; and in the lower layer of the protocol stack, determining the cycle length from the information.

According to a second aspect of the invention, there is provided a base station for use in a communication network, the base station comprising processing means adapted to determine information relevant to a discontinuous transmission and/or reception cycle length from a high layer in a protocol stack of the base station; provide the information to a lower layer in the protocol stack; and in the lower layer of the protocol stack, determine the cycle length from the information.

According to a third aspect of the invention, there is provided a mobile terminal for use in a communication network, the communication network comprising at least one base station as described above, the mobile terminal comprising processing means adapted to determine information relevant to a discontinuous transmission and/or reception cycle length from a high layer in a protocol stack of the mobile terminal; provide the information to a lower layer in the protocol stack; and in the lower layer of the protocol stack, determine the cycle length from the information.

According to a fourth aspect of the invention, there is provided a mobile terminal for use in a communication network, the communication network comprising at least one base station as described above, the mobile terminal comprising processing means adapted to determine a cycle length from signalling in a lower layer of a protocol stack received from the base station.

According to a fifth aspect of the invention, there is provided a mobile terminal for use in a communication network, the communication network comprising at least one base station as described above, the mobile terminal comprising processing means adapted to determine a cycle length from signalling in a high layer of a protocol stack received from the base station.

BRIEF DESCRIPTION OF THE DRAWINGS

The invention will now be described, by way of example only, with reference to the following drawings, in which:

FIG. 3 shows a mapping table in accordance with an embodiment of the invention.

DETAILED DESCRIPTION OF THE PREFERRED EMBODIMENTS

Although the invention will now be described with reference to discontinuous transmission and reception in Wideband Code Division Multiple Access (WCDMA) and Long Term Evolution (LTE) systems, it will be appreciated by a person skilled in the art that the invention is applicable to many other types of communication network.

Furthermore, in this specification, where the invention is discussed with reference to "DRX", meaning discontinuous reception and the deactivation of receiver circuitry, it will be appreciated that, unless otherwise explicitly indicated, the invention is equally applicable to discontinuous transmission (DTX) and the deactivation of transmitter circuitry.

Figure 1:
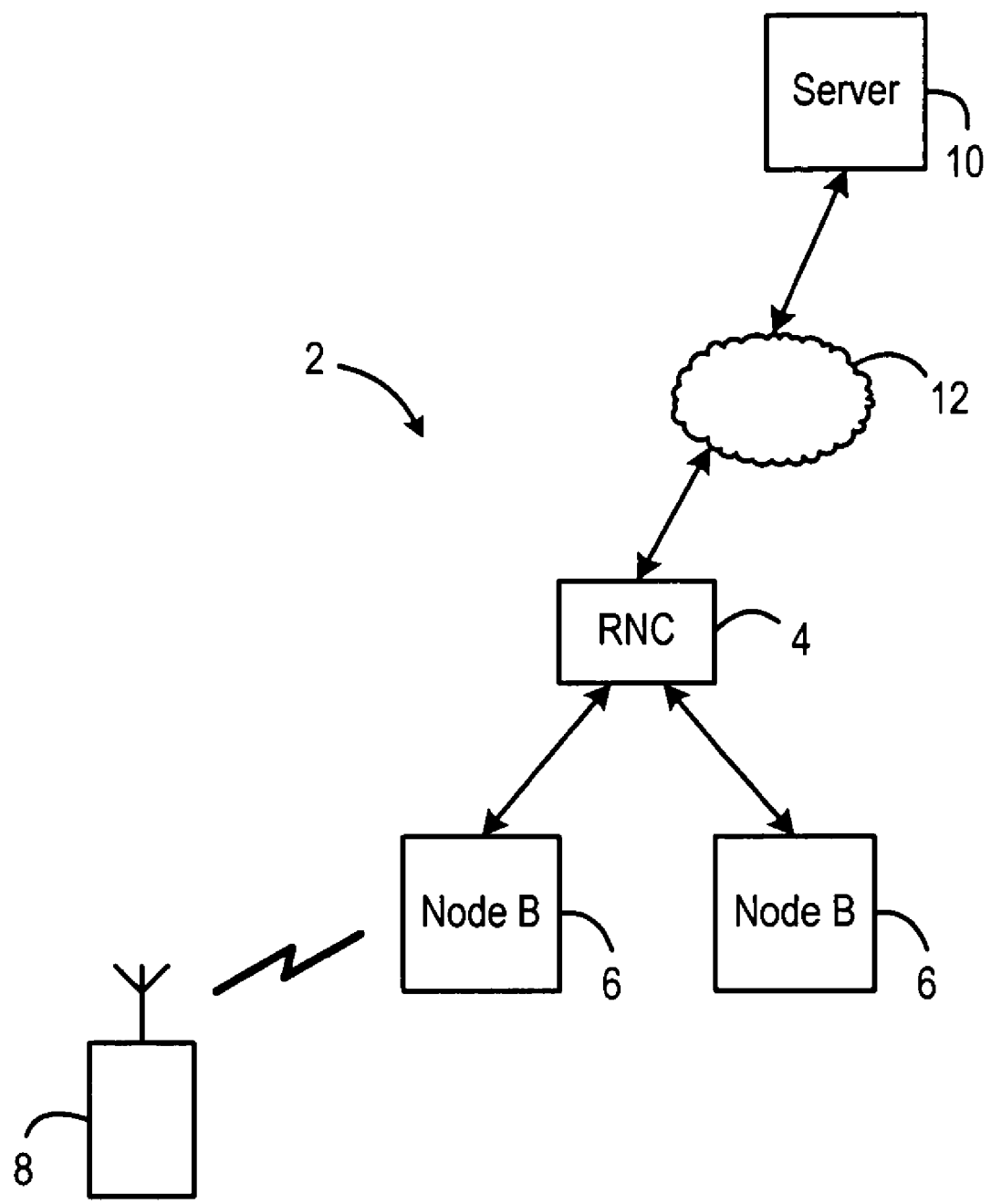
FIG. 1 shows a communication network in accordance with the invention.

FIG. 1 shows part of an exemplary WCDMA network 2 in accordance with the invention. The network 2 comprises a Radio Network Controller (RNC) 4, with two associated base stations 6, each known as a "Node B" that provide the access points to the WCDMA network for the user equipments. A mobile terminal 8 (sometimes termed User Equipment—UE, or Mobile Equipment—ME) receives services by communicating with one of the base stations 6. The RNC 4 controls the operation of the base stations 6, and provides the access point to the WCDMA network 2 for the communication network 12 (and thereby also for the Internet server 10). In this illustrated embodiment, the mobile terminal 8 is communicating with a server 10 through another communication network 12, such as the Internet. The server 10 may be providing a data service to the mobile terminal 8, such as a voice call, video call, file download, etc.

As described above, when the mobile terminal 8 is in an idle mode (i.e. it is not actively communicating with another peer entity such as a user equipment or an Internet server), it will monitor a paging channel to listen for any incoming call connection requests. In order to improve the battery life of the mobile terminal 8, the receiver circuitry is only activated during predefined intervals (called the paging occasion or wake up instance) to monitor the paging channel for incoming call connection requests, and it is deactivated at all other times. This is known as discontinuous reception (DRX), and the interval length as the discontinuous reception cycle length.

In addition, even when the mobile terminal 8 is active (i.e. it is in connected mode), it can deactivate its receiver circuitry between bursts of data from the RNC 4. In other words, a UE in active or connected mode can also operate in DRX mode. Therefore, the connected mode UE operating in DRX could receive data only at the wake up instances.

In both cases, the base station 6 serving the mobile terminal 8 and the mobile terminal 8 themselves must use the same DRX cycle length, and they must ensure that the DRX cycles are synchronised. This is to make it possible for the base station 6 to schedule and transmit (control or user plane) data for the UE when its receiver is switched on (that is, when the UE is "awake").

In accordance with the invention, in order to minimise the network signalling required to implement a variable DRX cycle length, information from a high layer in a protocol stack is used by the base station 6 and/or the mobile terminal 8 to adapt the DRX cycle length to the forthcoming data traffic pattern.

In one embodiment, the base station 6 examines the signalling in a high layer of its protocol stack (such as the Hyper-Text Transfer Protocol—HTTP, File Transfer Protocol—FTP and/or Real Time Control Protocol—RTCP layers) that the mobile terminal 8 uses towards its peer entity (the server 10).

Figure 2:
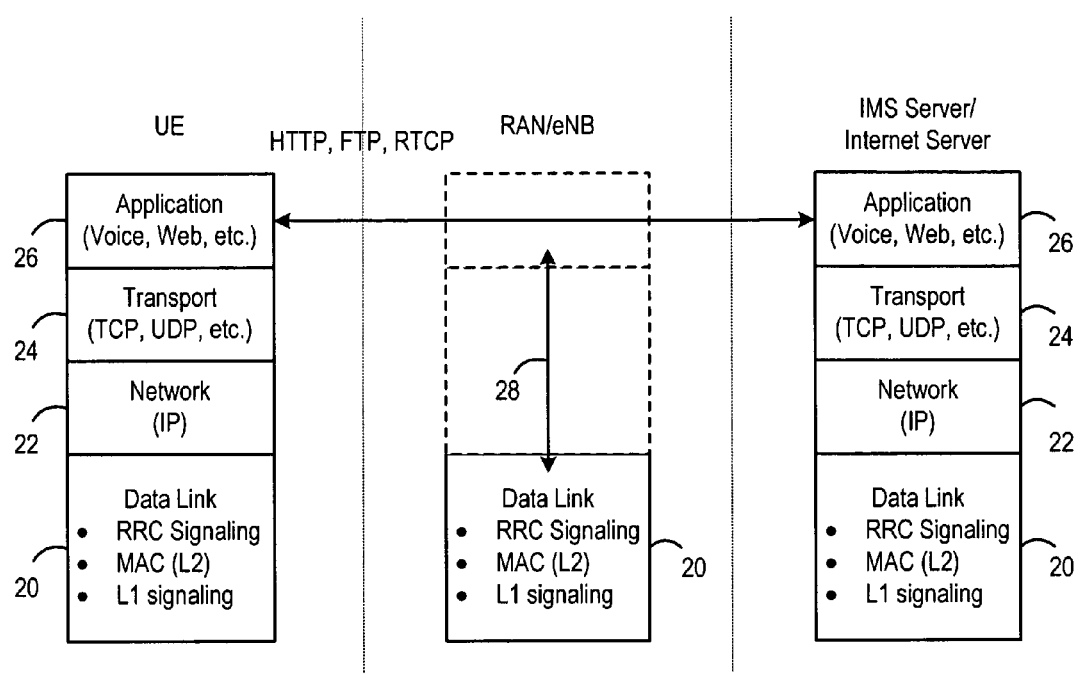
FIG. 2 is a layer model illustrating an embodiment of the invention.

An exemplary embodiment of the invention is shown in FIG. 2. In this Figure, the operations of the mobile terminal 8 (UE), base station 6 (RAN/eNB) and server 10 (IP Multimedia System—IMS—Server) are broken down into layers in accordance with the Open Systems Interconnection (OSI) Basic Reference Model which is a layered, abstract description for communications and computer network protocol design.

Each element in the network is shown as having a protocol stack that comprises four of the ordered layers from the OSI Model, and in particular a Data Link layer 20, which implements the RRC signalling, Media Access Control (MAC) signalling and L1 signalling; a Network layer 22, which implements the Internet Protocol (IP); a Transport layer 24, which implements the Transmission Control Protocol (TCP) and User Datagram Protocol (UDP); and an Application layer 26.

The Data Link layer 20 provides the means to transfer data between elements in the network and to detect errors that may occur in the Physical layer (which lies below the Data Link layer 20 but is not shown in FIG. 2). The Data Link layer 20 manages the interaction of devices with a shared medium.

The Network layer 22 provides the means of transferring variable length data packets from a source (e.g. the server 10) to a destination (e.g. the mobile terminal 8) via one or more networks while maintaining the quality of service requested by the Transport layer 24. The Network layer 22 performs network routing functions.

The Transport layer 24 controls the reliability of the link used to transfer data between the server 10 and mobile terminal 8, including initiating retransmissions for packets that are not successfully received.

The Application layer 26 interfaces with and performs application services for application processes executing on the server 10 or mobile terminal 8 respectively. The Application layer 26 provides services to user-defined application processes, and not to the end user.

Thus, in this embodiment, the protocol that implements discontinuous reception (which, in this embodiment, is part of the Data Link layer 20) in the base station 6 is adapted to examine or interrogate the 'higher' Application layer 26 (as indicated by arrow 28) to determine information about the forthcoming data traffic pattern. In a preferred embodiment, where the Network layer 22 uses the Internet Protocol, the DRX entity examines the structure (including information in the IP packet header and payload) of transported IP packets. In an alternative embodiment, the DRX protocol examines application layer packets (including header and payload information) carried as the payload of an IP packet.

Once this 'high' layer knowledge has been obtained, the base station 6 determines an appropriate DRX cycle length for the mobile terminal 8 using a predetermined algorithm.

Conventionally, the base station 6 does not process information in layers higher than the Data Link layer 20 (the RRC/MAC/RRC layer). However, in LTE systems, header compression and packet data convergence protocols are supported by the base station 6 (refer to FIG. 4.1 in the 3GPP specification 36.300). Thus, the base station 6 has ready access to higher layer information including IP packets and application layer packets.

Once information has been captured from the higher layer, it can be used as an input to the algorithm that determines the DRX parameters. Although it is known to take "high layer" quality of service information into account in conventional DRX algorithms, the base station 6 obtains this information from lower layer signalling received from the network (for example via the Iu or the S1 interfaces in WCDMA and LTE systems respectively). The Iu and S1 signalling protocols, commonly referred to as "radio bearer setup" procedures, classify applications into a small set of predefined categories (so called quality of service (QOS) classes) and use a coarse granularity of associated parameters to characterise traffic. However, since the traffic pattern (including packet sizes and their arrival rates) is random, and thus traffic behaviour cannot be accurately predicted, the selected DRX cycle based on radio bearer setup information may be shorter or longer than the ideal case. The examination of the higher layer signalling at the base station 6 (which includes the exact object or file size and detailed codec parameters) to determine application specific (that is, fine granularity) information overcomes these problems.

In accordance with an embodiment of the invention, the information obtained from the higher layer indicates a particular application that incoming data relates to (for example a voice call, video call, file download, etc.) and specific information relating to that application (for example data rate, total file size, etc.). Preferably, the algorithm that determines the DRX cycle length takes this application-specific information into account to find the best DRX cycle length for the mobile terminal 8.

In one embodiment of the invention, the base station 8 relates the information determined from the higher layer to a DRX cycle length using a mapping table.

An exemplary mapping table, which takes into account application-specific information to determine the DRX cycle length, is shown in FIG. 3. In the left-hand column of the table, four different application protocols are listed: HTTP (for handling web-based information); FTP (for handling the download of data files); a voice codec (for handling voice calls); and a video codec (for handling video calls).

The middle column of the mapping table indicates the application specific information that can affect the desired DRX cycle length. Thus, for the HTTP protocol, the application specific information indicates an object size in kilobytes (KB); for the FTP protocol, the application specific information indicates a file size in kilobytes (KB); and for the voice and video codecs, the application specific information indicates a codec type.

The third column of the mapping table indicates the DRX cycle length for the particular application and application specific information. For the HTTP and FTP protocols, the DRX cycle length decreases (i.e. the receiver circuitry is activated more often) as the object or file size increases. The object or file sizes provide knowledge to the base station 8 about the upcoming traffic situation. In a further embodiment, the base station 6 uses this information and information relating to the buffer state and radio condition (e.g. path loss) to determine the DRX cycle length.

For the voice and video codecs, the DRX cycle depends on the codec type (which is indicated in the RTCP protocol), and in particular on the sample frequency of the audio and video codecs respectively. Having knowledge about the periodicity of the codecs is important for determining the DRX cycle length.

In one embodiment of the invention, as the mobile terminal 8 also has access to the information in the 'higher' layer knowledge (by definition, as illustrated in FIG. 2), the DRX protocol in the Data Link layer 20 of the mobile terminal 8 can also examine the Application layer 26 (of the mobile terminal 8), and determine an appropriate DRX cycle length for the mobile terminal 8 using the same predetermined algorithm (such as the mapping table) as the base station 6.

In this embodiment, as the mobile terminal 8 and the base station 6 share common knowledge obtained from the higher layer, and they employ the same algorithm to determine the appropriate DRX cycle length, there is little or no need for dedicated control signalling between the devices 6, 8. Therefore, radio resources are conserved. In addition, this results in the DRX cycle length being adapted quickly to changing services or types of service in the network.

In other words, redundancy between the Application layer 26 signalling and lower level (DRX-related) signalling between the base station 6 and the mobile terminal 8 is eliminated.

The mapping table used by the base station 6 and mobile terminal 8 can be standardised (i.e. it follows predefined rules), or it can be determined by the base station 6 and mobile terminal 8 at the start of a session. In either case, there is no DRX-related control signalling over the radio interface during a session.

In alternative embodiments of the invention, only the base station 6 examines the higher layer to determine an appropriate DRX cycle length for the mobile terminal 8. Thus, it is necessary for the base station 6 to inform the mobile terminal 8 of the current DRX cycle length.

In one of the alternative embodiments, additional control signalling in the Data Link layer 20 is used to inform the mobile terminal 8 of the current DRX cycle length. Preferably, this signalling is implemented using RRC and/or MAC signalling as is conventional. This embodiment has the advantages that the base station 6 maintains full control over the mobile terminal 8, and it is not necessary to ensure that both the base station 6 and the mobile terminal 8 are using the same algorithm to determine the DRX cycle length.

In another of the alternative embodiments, the base station 6 uses a higher layer, and in particular the Application layer 26, to indicate the DRX cycle length to the mobile terminal 8. This embodiment has the same advantages as the embodiment described above and also that no additional Data Link layer 20 signalling is required. However, as the Application layer 26 operates on a significantly slower time scale than the Data Link layer 20, the time taken to inform the mobile terminal 8 of a new DRX cycle length is longer than in the previous embodiment. In addition, it may be difficult to implement this 'piggybacking' of DRX cycle length data onto existing Application layer protocols, such as HTTP or FTP, unless modifications to these protocols were made.

Figure 4:
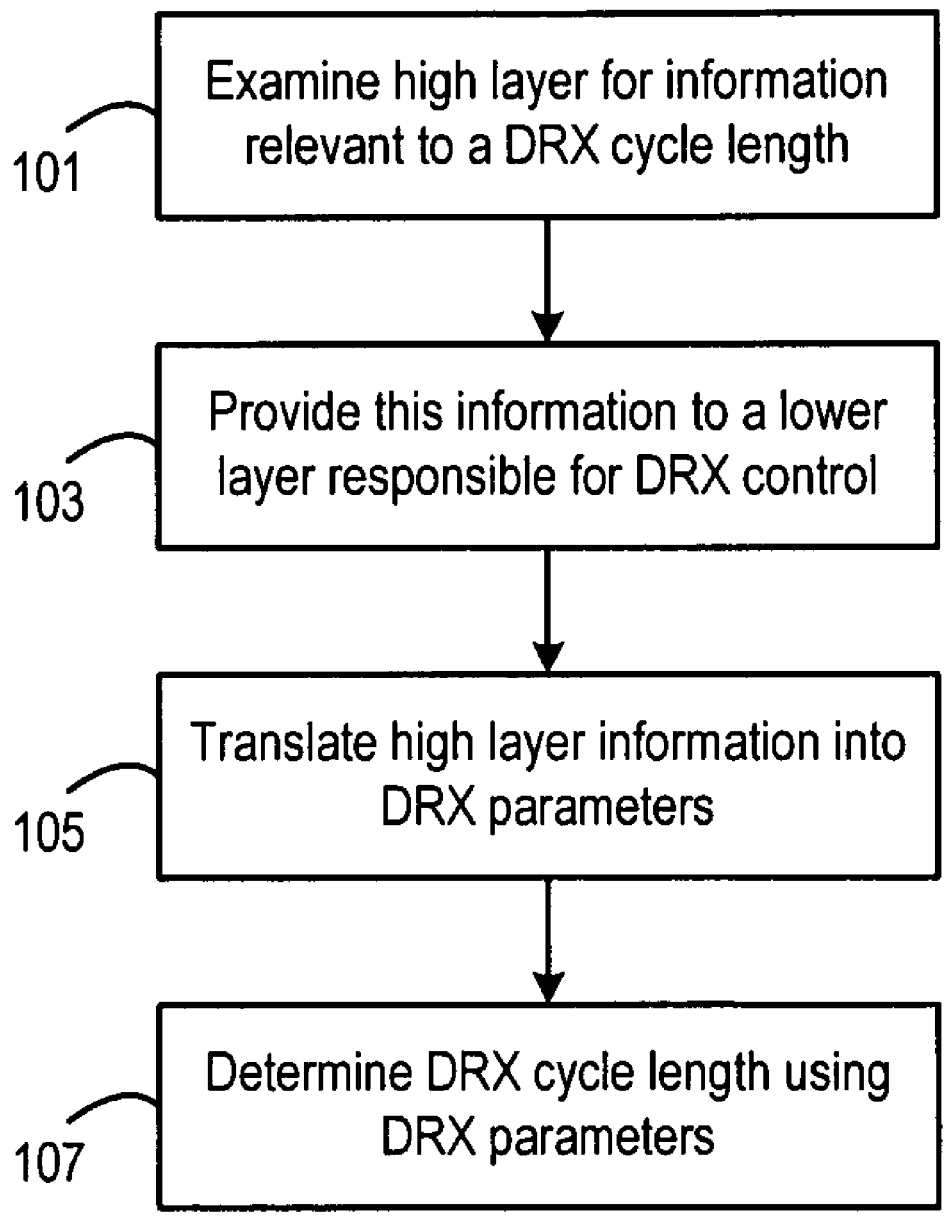
FIG. 4 is a flow chart illustrating a method in accordance with the invention.

FIG. 4 shows a method in accordance with the invention. In step 101, a high layer, for example the Application layer 26, is examined for information that can be used to determine a DRX cycle length. In step 103, this information is provided to a lower layer, for example the Data Link layer 20, that is responsible for DRX cycle length control. In step 105, this high layer information is translated into parameters that can be used to determine the DRX cycle length. As described above, the high layer information can be application specific information. In step 107, the DRX parameters are used to determine the DRX cycle length, which, as described above, can comprise using a mapping table.

In the embodiment of the invention in which the base station 6 and mobile terminal 8 independently examine the higher layer for information that can be used to determine the DRX cycle length, both devices 6, 8 use the method as shown in FIG. 4.

It should be noted that the above-mentioned embodiments illustrate rather than limit the invention, and that those skilled in the art will be able to design many alternative embodiments without departing from the scope of the appended claims. The word 'comprising' does not exclude the presence of elements or steps other than those listed in a claim.

Furthermore, the above embodiments are applicable to mobile terminals operating in DRX in both idle and connected/active modes. The mobile terminal activity mode is changed from idle to connected and vice versa depending on data activity. The invention relies on the inspection of higher (application) layer packets, which are typically received during the active mode. The DRX selection in idle mode could still be based on the higher (application) layer packets received during the recent active mode.

The invention claimed is:

1. A method of determining a discontinuous reception or transmission cycle length, the method comprising:
    determining information relevant to the cycle length from a high layer in a protocol stack;
    providing the information to a lower layer in the protocol stack; and
    in the lower layer of the protocol stack, determining the cycle length from the information;
    wherein the step of determining the cycle length from the information comprises using a predetermined algorithm, the predetermined algorithm comprising a mapping table relating information values to respective cycle lengths.

2. The method of claim 1, wherein the information relevant to the cycle length comprises application specific information.

3. The method of claim 2, wherein the application specific information comprises at least one of object type, service type, object size, file size, and codec parameters.

4. The method of claim 1, wherein the high layer is an Application layer.

5. The method of claim 1, wherein the high layer comprises an Internet protocol layer.

6. The method of claim 1, wherein the lower layer is a Data Link layer.

7. The method of claim 1, wherein the method is carried out in a base station.

8. The method of claim 7, wherein the method is also carried out in a mobile terminal.

9. The method of claim 7, further comprising the step of:
    indicating the determined cycle length to a mobile terminal.

10. The method of claim 9, wherein the step of indicating comprises transmitting the determined cycle length to the mobile terminal using signaling in the lower layer of the protocol stack.

11. The method of claim 9, wherein the step of indicating comprises transmitting the determined cycle length to the mobile terminal using signaling in the high layer of the protocol stack.

12. The method of claim 8, wherein the mobile terminal is in an idle mode.

13. The method of claim 8, wherein the mobile terminal is in an active or connected mode.

14. A base station for use in a communication network, the base station comprising one or more processing circuits configured to:
   determine information relevant to a discontinuous transmission or reception cycle length from a high layer in a protocol stack of the base station;
   provide the information to a lower layer in the protocol stack; and
   in the lower layer of the protocol stack, determine the cycle length from the information using a predetermined algorithm that comprises a mapping table relating information values to respective cycle lengths.

15. The base station of claim 14, wherein the information relevant to the cycle length comprises application specific information.

16. The base station of claim 15, wherein the application specific information comprises at least one of object type, service type, object size, file size, and codec parameters.

17. The base station of claim 14, wherein the high layer is an Application layer.

18. The base station of claim 14, wherein the high layer comprises an Internet protocol layer.

19. The base station of claim 14, wherein the lower layer is a Data Link layer.

20. The base station of claim 14, wherein the base station is further configured to indicate the determined cycle length to a mobile terminal.

21. The base station of claim 20, wherein the base station is configured to indicate the determined cycle length to the mobile terminal by transmitting the determined cycle length to the mobile terminal using signaling in the lower layer of the protocol stack.

22. The base station of claim 20, wherein the base station is configured to indicate the determined cycle length to the mobile terminal by transmitting the determined cycle length to the mobile terminal using signaling in the high layer of the protocol stack.

23. The base station of claim 20, wherein the base station is configured to indicate the determined cycle length to the mobile terminal when it is operating in an idle mode.

24. The base station of claim 20, wherein the base station is configured to indicate the determined cycle length to the mobile terminal when it is operating in an active or connected mode.

25. A mobile terminal for use in a communication network, the mobile terminal comprising one or more processing circuits configured to:
   determine information relevant to a discontinuous transmission and/or reception cycle length from a high layer in a protocol stack of the mobile terminal;
   provide the information to a lower layer in the protocol stack; and
   in the lower layer of the protocol stack, determine the cycle length from the information using a predetermined algorithm that comprises a mapping table relating information values to respective cycle lengths.

26. The mobile terminal of claim 25, wherein the information relevant to the cycle length comprises application specific information.

27. The mobile terminal of claim 26, wherein the application specific information comprises at least one of object type, service type, object size, file size, and codec parameters.

28. The mobile terminal of claim 25, wherein the high layer is an Application layer.

29. The mobile terminal of claim 25, wherein the high layer comprises an Internet protocol layer.

30. The mobile terminal of claim 25, wherein the lower layer is a Data Link layer.

31. The mobile terminal of claim 25, wherein the processing circuits are configured to determine said cycle length when the mobile terminal is in an idle mode.

32. The mobile terminal of claim 25, wherein the processing circuits are configured to determine said cycle length when the mobile terminal is in an active or connected mode.

* * * * *